(12) United States Patent
Gimat et al.

(10) Patent No.: US 10,131,073 B2
(45) Date of Patent: Nov. 20, 2018

(54) MONOBLOC BLADE PREFORM AND MODULE FOR A TURBO MACHINE INTERMEDIATE CASING

(71) Applicant: SAFRAN AIRCRAFT ENGINES, Paris (FR)

(72) Inventors: Matthieu Gimat, Moissy-Cramayel (FR); Dominique Coupe, Le Haillan (FR); Yann Marchal, Moissy-Cramayel (FR); Thierry Papin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 180 days.

(21) Appl. No.: 14/442,577

(22) PCT Filed: Nov. 12, 2013

(86) PCT No.: PCT/FR2013/052713
§ 371 (c)(1),
(2) Date: May 13, 2015

(87) PCT Pub. No.: WO2014/076407
PCT Pub. Date: May 22, 2014

(65) Prior Publication Data
US 2015/0354377 A1    Dec. 10, 2015

Related U.S. Application Data

(60) Provisional application No. 61/725,622, filed on Nov. 13, 2012.

(51) Int. Cl.
*F01D 9/04*     (2006.01)
*B29B 11/16*    (2006.01)
(Continued)

(52) U.S. Cl.
CPC ............. *B29B 11/16* (2013.01); *F01D 5/146* (2013.01); *F01D 5/282* (2013.01); *F01D 9/042* (2013.01);
(Continued)

(58) Field of Classification Search
CPC . F01D 9/042; F01D 9/04; F01D 5/146; F01D 5/282; F04D 29/023; F04D 29/542;
(Continued)

(56) References Cited

U.S. PATENT DOCUMENTS 3,501,090 A  *  3/1970  Losee ................... F01D 5/282
                                                        416/189
4,958,663 A  *  9/1990  Miller ................. D03D 25/005
                                                        139/384 R
(Continued)

FOREIGN PATENT DOCUMENTS

FR    2 946 999 A1    12/2010
FR    2 953 885 A1     6/2011
(Continued)

OTHER PUBLICATIONS

U.S. Appl. No. 14/442,484, filed May 13, 2015, Gimat, et al.
(Continued)

*Primary Examiner* — Justin Seabe
*Assistant Examiner* — Joshua R Beebe
(74) *Attorney, Agent, or Firm* — Oblon, McClelland, Maier & Neustadt, L.L.P.

(57) ABSTRACT

A fiber preform for a vane module of an intermediate casing of a turbine engine, the preform being obtained by three-dimensional weaving. The preform includes first longitudinal segment presenting opposite first and second ends and suitable for forming a first vane; a second longitudinal segment presenting first and second opposite ends and suitable for forming a second vane; and a first transverse
(Continued)

segment connecting together the first and second longitudinal segments by their first ends, and suitable for forming a first transverse vane portion such as a flange or a platform.

13 Claims, 10 Drawing Sheets

(51) Int. Cl.
    *F01D 5/28*     (2006.01)
    *F01D 5/14*     (2006.01)
    *B29L 31/08*     (2006.01)

(52) U.S. Cl.
    CPC ... *B29L 2031/087* (2013.01); *F05D 2300/603* (2013.01); *Y02T 50/672* (2013.01); *Y02T 50/673* (2013.01)

(58) Field of Classification Search
    CPC ............. F04D 29/544; F05D 2300/603; F05D 2300/6012; F05D 2300/6034; F05D 2230/51; F05D 2240/12; B29L 2031/087; B29B 11/16; Y02T 50/672; Y02T 50/673
    See application file for complete search history.

(56) References Cited

U.S. PATENT DOCUMENTS

| | | | | |
|---|---|---|---|---|
| 5,854,154 | A * | 12/1998 | Radford | C04B 35/624 264/621 |
| 5,921,754 | A * | 7/1999 | Freitas | B29C 70/345 264/103 |
| 6,196,794 | B1 * | 3/2001 | Matsumoto | B29C 65/5042 415/191 |
| 6,676,373 | B2 * | 1/2004 | Marlin | B29C 70/34 29/889.71 |
| 2003/0185673 | A1 * | 10/2003 | Matsumoto | F01D 5/282 415/159 |
| 2006/0275112 | A1 * | 12/2006 | Lee | F01D 5/143 415/191 |
| 2007/0141368 | A1 * | 6/2007 | Farmer | F01D 5/288 428/469 |
| 2008/0063520 | A1 * | 3/2008 | Baumann | F01D 5/06 415/209.3 |
| 2011/0311368 | A1 * | 12/2011 | Coupe | B29C 70/222 416/241 A |
| 2012/0099982 | A1 * | 4/2012 | Coupe | C04B 35/524 415/200 |
| 2013/0089429 | A1 | 4/2013 | Nunez et al. | |
| 2013/0156594 | A1 * | 6/2013 | Kray | F01D 9/042 416/241 A |

FOREIGN PATENT DOCUMENTS

| | | |
|---|---|---|
| JP | 11-350904 A | 12/1999 |
| JP | 2012-530212 A | 11/2012 |
| WO | WO 91/15357 A1 | 10/1991 |
| WO | WO 98/08370 A2 | 3/1998 |
| WO | WO 2010/146288 A1 | 12/2010 |
| WO | WO 2012/175867 A1 | 12/2012 |

OTHER PUBLICATIONS

International Search Report dated May 8, 2014 in PCT/FR2013/052713.

Japanese Office Action dated Sep. 26, 2017 in Patent Application No. 2015-542332.

\* cited by examiner

MONOBLOC BLADE PREFORM AND MODULE FOR A TURBO MACHINE INTERMEDIATE CASING

FIELD OF THE INVENTION

The present specification relates to a fiber preform for a vane module made of composite material for an intermediate casing of a turbine engine, and also to a single-piece vane module, an intermediate casing, and a turbine engine, as obtained thereby.

Such a preform may be used to make single-piece vane modules each incorporating a plurality of vanes together with transverse vane portions such as flanges or aerodynamic platforms. Such modules present considerable stiffness and are suitable for incorporating in the intermediate casing of an airplane turbojet, for example.

STATE OF THE PRIOR ART

A conventional bypass turbojet has a fan delivering a stream of air that is split into both a primary stream that is directed to the compressors, the combustion chamber, and then the turbines of the turbine engine, and also a secondary or bypass stream that delivers the major fraction of the thrust.

The secondary stream flows in a secondary passage provided between the outer casing of the jet and an inner casing containing the hot portion of the turbine engine. Those two casings are connected together and held in place by an intermediate casing made up of an inner hub, an outer shroud, and a plurality of structural arms extending radially and connecting the inner hub to the outer shroud. In addition to their structural function of supporting the loads that result from the dynamic behavior of the turbine engine as a whole, some of the structural arms are hollow, thereby enabling services to be passed such as fluid pipework, electric cables, or indeed members for transmitting mechanical power.

In addition, such a turbine engine includes a guide nozzle made up of a plurality of stationary vanes, commonly referred to as outlet guide vanes (OGVs) for the purpose of straightening out the secondary stream coming from the fan.

In order to reduce the weight of turbojets and also the number of parts making them up, proposals have been made for intermediate casings that incorporate the nozzle function with some of the structural arms being replaced by guide vanes. Nevertheless, such vanes thus need to be capable of providing not only their aerodynamic function, but also a structural function for which they are not usually designed.

In order to reinforce the mechanical strength of such vanes, proposals have been made, in particular in French patent application FR 2 956 876, to design modules in the form of boxes made up of two vanes tangentially bolted to inner and outer platforms. Nevertheless, even though the progress achieved by that solution is already significant, the overall stiffness of such a module is limited by the tangential junctions of the bolts. In addition, such a solution still involves a large number of parts, in particular fasteners, and it would be desirable to reduce that number in order to achieve further savings in terms of weight and maintenance time.

There therefore exists a real need for a fiber preform, a vane module, an intermediate casing, and a turbine engine that avoid the drawbacks inherent to the above-mentioned prior art systems.

SUMMARY OF THE INVENTION

The present invention provides a fiber preform for a vane module of an intermediate casing of a turbine engine, the preform being obtained by three-dimensional (3D) weaving. The preform comprises a first longitudinal segment presenting first and second opposite ends and suitable for forming a first vane; a second longitudinal segment presenting opposite first and second ends and suitable for forming a second vane; and a first transverse segment connecting together the first and second longitudinal segments by their first ends, and suitable for forming a first transverse vane portion such as a flange or a platform.

In the present specification, the terms "longitudinal", "transverse", "bottom", "top", and derivatives thereof are defined relative to the main direction of the vanes making up a module; the terms "axial", "radial", "tangential", "inner", "outer", and derivatives thereof are defined relative to the main axis of the intermediate casing and of the turbine engine.

The term "transverse vane portion" is used herein to mean a portion of the module that extends substantially transversely relative to the vanes: it may in particular comprise a fastener flange for bearing against the inner hub of the intermediate casing so as to enable the module to be fastened using holes or fastener tabs; it may also constitute an aerodynamic platform enabling the second passage to be provided with walls that are smooth and do not disturb the secondary flow. Other transverse vane portions can be envisaged.

Using such a preform, it is possible to design a single-piece module made up of at least two vanes that are connected together at one of their ends: such a single-piece configuration enables mechanical loads to be distributed more effectively on the pair of vanes. This leads to increased overall stiffness of the module, thus enabling parts to be used that are less heavy, thereby achieving significant savings in operation. The use of composite materials also achieves significant weight savings compared with similar parts made of metal or of ceramic.

In addition, because of this one-piece design, the number of parts that need to be designed and assembled is greatly reduced, in particular there is a saving in terms of fasteners, and thus in terms of the weight and the cost associated therewith.

Naturally, maintenance of such a single-piece module is also made easy since disassembly operations are less numerous: in particular, it is possible to act directly under the wing because the fastenings are less numerous and more accessible.

In certain embodiments, the preform further comprises a second transverse segment extending transversely from the second end of the first longitudinal segment and suitable for forming a second transverse vane portion; and a third transverse segment extending transversely from the second end of the second longitudinal segment and suitable for forming a third transverse vane portion. The number of parts that are incorporated is thus increased so the number of fastenings required is reduced further: the overall stiffness is improved, assembly and disassembly are made easier, and both the weight and number of different types of part are also reduced.

In certain embodiments, the second transverse segment extends away from the second longitudinal segment, and the third transverse segment extends away from the first longitudinal segment. This produces a preform having an omega shape.

In certain embodiments, the second transverse segment extends towards the second longitudinal segment, and the third transverse segment extends away from the first longitudinal segment. This produces a box structure.

In certain embodiments, the second transverse segment extends towards the second longitudinal segment, and the third transverse segment extends towards the first longitudinal segment. This produces a different box structure in which the second and third transverse segments extend towards each other.

In certain embodiments, the second and third transverse segments overlap, at least in part. This overlap zone is thus beneficial to greater stiffness and thickness, and therefore gives more options for drilling.

In other embodiments, the second and third transverse segments are fitted one extending another. This embodiment gives precedence to reducing size and weight.

In certain embodiments, in the overlap zones, the overlapping segments are adhesively bonded together. They could equally well be stitched together.

In certain embodiments, the preform comprises first and second sheets that are woven together and that comprise an interlinked zone forming an additional transverse segment suitable for forming a transverse vane portion, and a non-interlinked zone in which the first sheet forms the first transverse segment and the first longitudinal segment, and in which the second sheet forms the second longitudinal segment. Such non-interlinking makes it possible to obtain a branching configuration.

In certain embodiments, the preform has at least three longitudinal segments suitable for forming at least three vanes. Naturally, the same technique may be extended to n-tuplets of vanes.

In certain embodiments, the transverse segments include a greater number of layers of yarns than do the longitudinal segments, and so they are therefore thicker. In this way, the vanes may be fine so as to be effective in performing their aerodynamic role, while the transverse vane portions may be thicker so as to enable the module to be fastened more securely.

In certain embodiments, the transverse segments are woven with extra lengths for forming fastener tabs. The extra lengths may be lateral and folded radially to enable the transverse plane portions to be fastened axially to the intermediate casing. They may equally well be end lengths and folded radially to enable the transverse vane portions to be fastened tangentially to the intermediate casing.

In certain embodiments, the longitudinal segments are woven with extra lengths for forming fastener tabs. The extra lengths then extend the longitudinal segments longitudinally to enable the vanes to be fastened tangentially to the intermediate casing.

In certain embodiments, the yarns used for weaving the preform comprise carbon fibers. Nevertheless, they may be any other type of yarn, for example yarns comprising glass fibers or kevlar fibers.

In certain embodiments, the weave used for the three-dimensional weaving of the preform may be a 3D interlock type weave. Nevertheless, the weaving of the outside surfaces of the passage may be essentially two-dimensional, e.g. being woven with a satin type weave.

The present specification also relates to a module for making an intermediate casing of a turbine engine, said module having two longitudinal vanes and a transverse vane portion, such as a flange or a platform, interconnecting the two vanes at one of their ends, said module being a single-piece part.

By means of this single-piece configuration incorporating at least two vanes and a transverse vane portion, the above-described advantages in terms of mechanical strength, weight, cost, ease of dismantling, and ease of preparation are all obtained.

In certain embodiments, the module is made of a composite material from a fiber preform according to any of the above-described embodiments, said preform being shaped and embedded in a matrix.

In certain embodiments, the matrix is of the organic type. In particular, it may be an epoxy resin.

In other embodiments, the matrix may be of the ceramic type.

The present specification also relates to an intermediate casing for a turbine engine, the casing including a plurality of modules according to any of the above-described embodiments that are disposed angularly between an inner hub and an outer shroud.

In certain embodiments, the intermediate casing includes modules presenting differing configurations from among those of the embodiments described above in order to adapt to specific features of each zone of the intermediate casing, in particular in terms of mechanical loading or of accessibility for disassembly.

In particular, in certain embodiments, some of the modules may be arranged head to toe within the intermediate casing.

Finally, the present specification relates to a turbine engine including an intermediate casing according to any of the above-described embodiments.

The above-described characteristics and advantages, and others, appear on reading the following detailed description of embodiments of the preform, of the module, of the intermediate casing, and of the turbine engine that are proposed. This detailed description makes reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are identified by the same reference signs. In addition, elements (or portions of an element) forming parts of different embodiments but having functions that are analogous are identified in the figures by numerical references that are incremented by 100, 200, etc.

FIGS. 3A and 3B are perspective views of two variants of such a module; FIG. 3C shows the associated complete annulus; FIG. 3D shows the preform laid out flat; and FIG. 3E shows the shaping of the preform.

FIG. 4A is a perspective view of such a module; FIG. 4B shows the associated complete annulus; FIG. 4C shows the preform laid out flat; FIG. 4D shows the preform being shaped; and FIGS. 4E and 4F show variant fastenings for the module.

FIG. 5A is a perspective view of such a module; FIG. 5B shows the associated complete annulus; FIG. 5C shows the preform laid out flat; and FIGS. 5D and 5E show two variants of shaping the preform.

FIG. 6A is a perspective view of such a module; FIG. 6B shows the associated complete annulus; FIG. 6C shows the preform laid out flat; FIG. 6D shows the preform being shaped; FIG. 6E is a diagram showing how a non-interlinked portion is woven; FIG. 6F shows a variant way in which the preform can be shaped; FIG. 6G shows a variant embodiment of the module; and FIG. 6H shows this variant being shaped.

DETAILED DESCRIPTION OF EMBODIMENTS

In order to make the invention more concrete, embodiments are described in detail below with reference to the accompanying drawings. It should be recalled that the invention is not limited to these embodiments.

Figure 1:
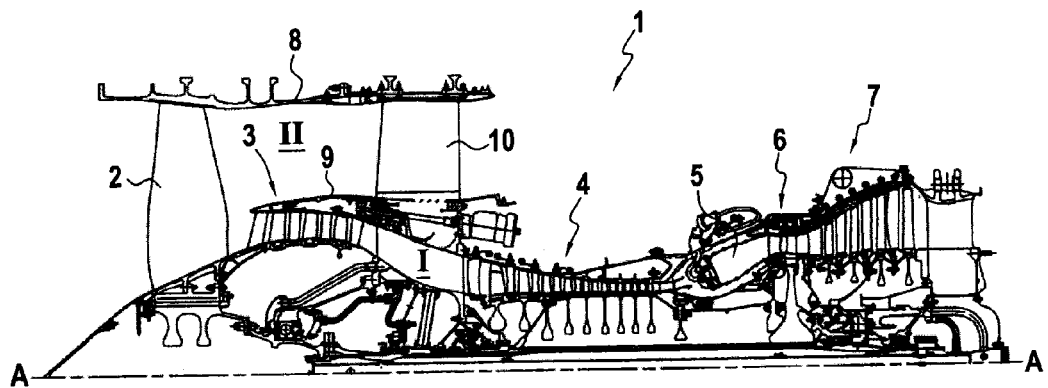
FIG. 1 is an elevation view in section of a turbine engine of the invention.

FIG. 1 is a section view on a vertical plane containing the main axis A of a bypass turbojet 1 of the invention. Going from upstream to downstream it comprises: a fan 2; a low pressure compressor 3; a high pressure compressor 4; a combustion chamber 5; a high pressure turbine 6; and a low pressure turbine 7. In its upstream portion, this turbojet 1 has an outer casing 8 and an inner casing 9 defining two concentric passages, a primary passage I and a secondary passage II. An intermediate casing 10 connects the outer and inner casings 8 and 9 together.

In operation, the inner casing 9 splits the stream of air accelerated by the fan 2 both into a primary stream that takes the primary passage I and feeds the compressors 3, 4, the combustion chamber 5, and the turbines 6, 7, and also into a secondary stream that takes the secondary or "bypass" passage II from which it is ejected out of the turbojet, thereby delivering the major part of its thrust.

Figure 2:
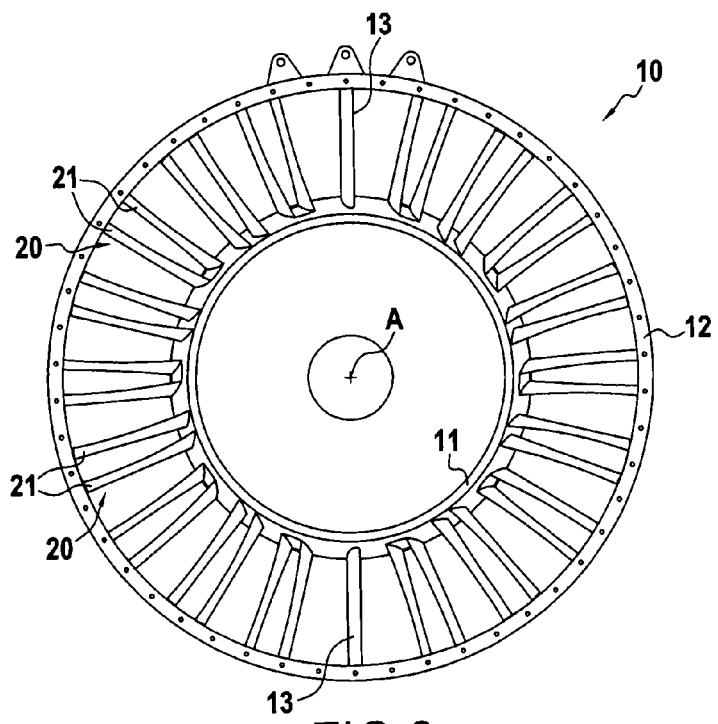
FIG. 2 is a front view of an intermediate casing in a first embodiment.

FIG. 2 is a diagrammatic front view of such an intermediate casing 10. It comprises an inner hub 11 fastened to the inner casing 9 and an outer shroud 12 fastened in the outer casing 8. The inner hub 11 and the outer shroud 12 are connected together radially firstly by structural arms 13 and secondly by outlet guide vanes (OGVs) 21 that are grouped together in pairs constituting single-piece modules 20.

The structural arms 13 are hollow and serve to pass services between the core of the jet enclosed in the inner casing 9 and the periphery of the jet 1. Such services include in particular hydraulic pipework, pneumatic pipes, electric cables, and indeed mechanical power transmission shafts. These structural arms are preferably situated at 6 o'clock and at 12 o'clock relative to the axis A of the turbojet 1, i.e. in the vertical plane where most of the mechanical loads exerted by the weight of the turbojet 1 accumulate.

Figure 3A:
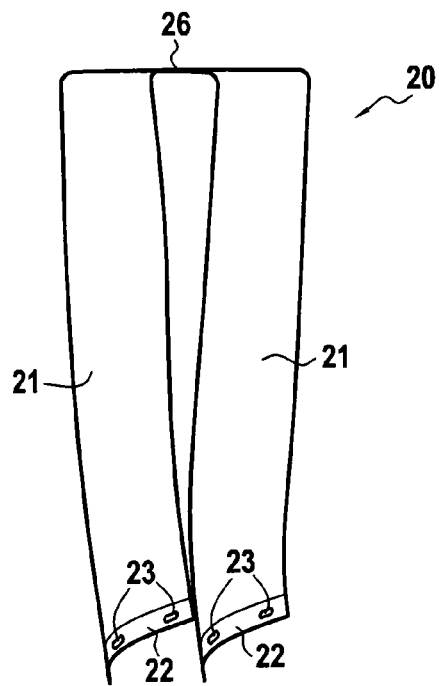
FIGS. 3A to 3E show a first example of a module of the invention.

FIGS. 3A to 3E show a first embodiment of a module for such an intermediate casing 10. In FIG. 3A, it can be seen that this first module embodiment 20 is generally U-shaped. It comprises two longitudinally extending vanes 21 and a transverse vane portion 26 interconnecting the two vanes 21 at their top ends.

Depending on the type of fastening between the module 20 and the intermediate casing 10 via the transverse vane portion 26, this portion may be an aerodynamic platform constituting a smooth and aerodynamic wall for the secondary passage II of the turbine engine 1, or it may be a flange for fastening the module 20 to the intermediate casing 10. In particular, if the transverse vane portion 26 does not have any fastenings or has fastenings that are suitable for not projecting into the passage II, such as axial or tangential fastenings, the transverse vane portion 26 may act as a platform. In contrast, if the transverse vane portion 26 requires a fastening that projects into the passage II, in particular if it is a radial fastening, then the transverse vane portion 26 acts as a flange and an aerodynamic platform needs to be superposed on the transverse vane portion 26 in order to mask its fastenings. Such examples are described below with reference to the second embodiment.

In this embodiment, the vanes 21 have extra lengths 22 at their free ends, i.e. their bottom ends, which extra lengths 22 have holes 23 and are suitable for inserting in a base fastened to the intermediate casing 10 to enable the module 20 to be fastened thereto: the module 20 is thus held tangentially by fastener elements such as bolts inserted in the holes 23.

Figure 3B:
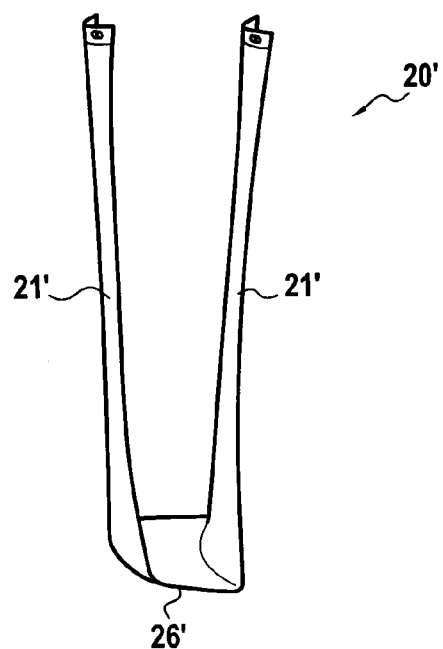

FIG. 3B shows an embodiment variant of the U-shaped module 20' in a configuration that is inverted head-to-toe relative to the variant of FIG. 3A: this module 20' likewise has two vanes 21' and a transverse vane portion 26', but this transverse portion interconnects the bottom ends of the vanes 21'. In addition, the branches of the U-shape diverge a little whereas in the variant of FIG. 3A they converge a little: these angles of inclination ensure that the vanes 21 and 21' do indeed extend radially within the intermediate casing 10.

Figure 3C:
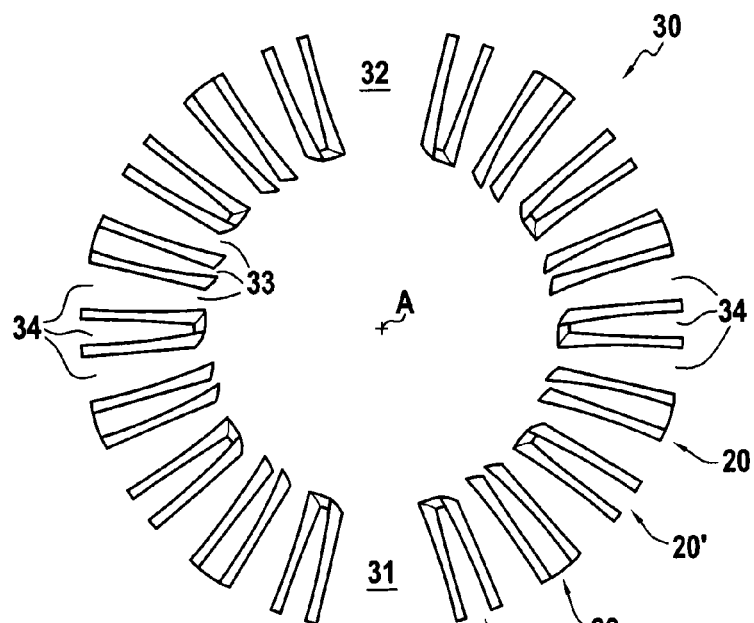

FIG. 3C shows the complete annulus 30 constituted by modules 20 and 20' for mounting in the intermediate casing 10. The annulus 30 thus comprises a succession of modules alternating between the variant 20 of FIG. 3A and the variant 20' of FIG. 3B: this head-to-toe configuration serves to reinforce the overall stiffness of the annulus. In addition, the modules 20 and 20' are arranged in such a manner that the spacing between the vanes 21 and 21' is substantially identical all around the annulus 30. The empty sectors 31 and 32 situated respectively at 6 o'clock and at 12 o'clock relative to the main axis A correspond to the positions of the structural arms 13 of the intermediate casing 10. The bottom and top vacant segments 33 and 34 situated respectively between the bottom and top transverse vane portions 26' and 26 of the modules 20 and 20' may be filled in during assembly of the annulus 30 in the intermediate casing 10 by aerodynamic panels (not shown) serving to complete the wall of the secondary passage II.

Figure 3D:
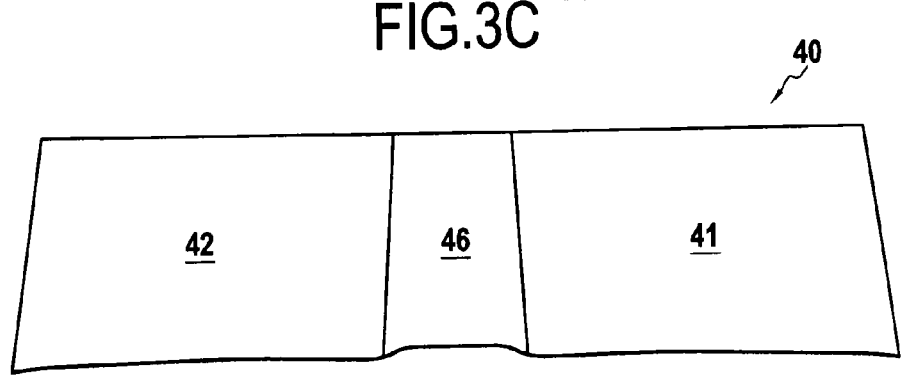
Figure 3E:
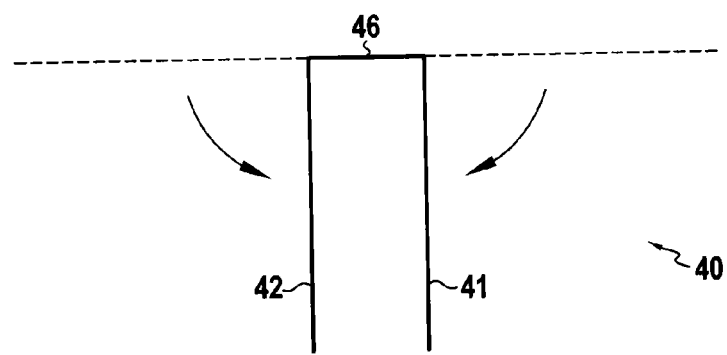

FIG. 3D shows the woven preform 40 laid out flat, which preform is used for making this first module embodiment 20. FIG. 3E shows how this preform 40 is shaped in order to obtain the module 20. Going from upstream to downstream, i.e. from right to left in the figures, this preform 40 comprises a first longitudinal segment 41, that is to form a first vane 21, a transverse segment 46 that is to form the transverse vane portion 26, and a second longitudinal segment 42 that is to form the second vane 21 of the module 20.

The preform 40 is taken from a 3D woven sheet of carbon fibers, made using a 3D interlock weave. Only the surfaces of the preform 40 are woven two-dimensionally (2D) with a satin type weave. In order to obtain vanes 21 that are fine and transverse vane portions 26 that are thicker, the transverse segment 46 of the preform 40 has a larger number of layers of yarns than do the longitudinal segments 41 and 42: methods of weaving that make it possible to obtain such a variation in thickness and in number of layers are nowadays well known in the field of 3D weaving. Once the sheet has been woven, it needs to be cut and shaped in order to obtain the shape desired for the module. These operations are computer assisted. Algorithms thus serve to calculate the pattern for the preform 40 that is to be cut out from the sheet as obtained by the weaving. In addition, algorithms calculate the directrix curve used for performing shaping.

Once cut out, the preform 40 is moistened in order to soften it and make it easier to register the fibers. The preform 40 is then inserted using the calculated directrix curve into a forming module of inside space that matches the shape desired for the preform 40. In this embodiment, as shown by arrows in FIG. 3E, shaping essentially consists in folding the longitudinal segments 41 and 42 relative to the transverse segment 46.

The preform 40 is then dried so as to stiffen it, thereby locking it in the shape imposed during shaping. The preform 40 is then placed in an injection mold having the dimensions of the desired final module, and a matrix is injected into the mold, in this example an epoxy resin. Such injection may be performed using the known resin transfer molding (RTM) technique. At the end of this step, a module 20 is thus obtained made of composite material comprising a preform 40 woven out of carbon fibers embedded in an epoxy resin. The method may possibly be finished off with machining steps in order to finalize the module 20.

Figure 4A:
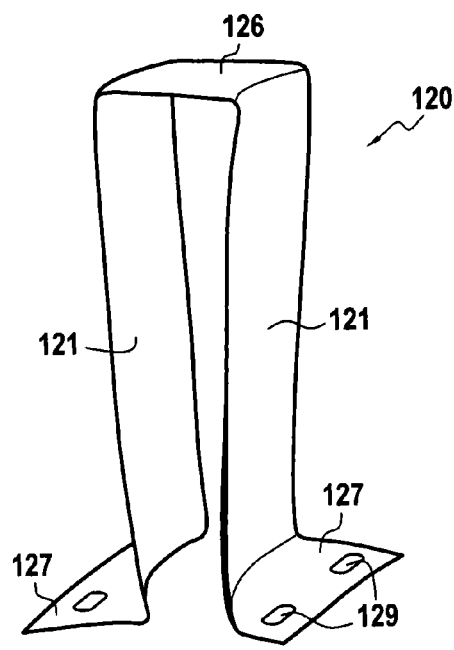
FIGS. 4A to 4F show a second example of a module of the invention.

FIGS. 4A to 4F show a second embodiment of a module for the intermediate casing 10. In FIG. 4A, it can be seen that the second module embodiment 120 is generally omega-shaped. It has two longitudinal vanes 121, a top transverse vane portion 126 interconnecting the two vanes 121 at their top ends, and two bottom transverse vane portions 127, each extending transversely from the bottom end of a example vane 121 away from the other bottom portion.

In FIG. 4A, the bottom transverse vane portions 127 have radial holes 129 enabling the module 120 to be fastened to the intermediate casing 10. These bottom transverse vane portions 127 thus constitute fastener flanges that require aerodynamic platforms to be put into place over the flanges 127 in order to mask the fastener elements that would otherwise project into the secondary passage II.

Figure 4B:
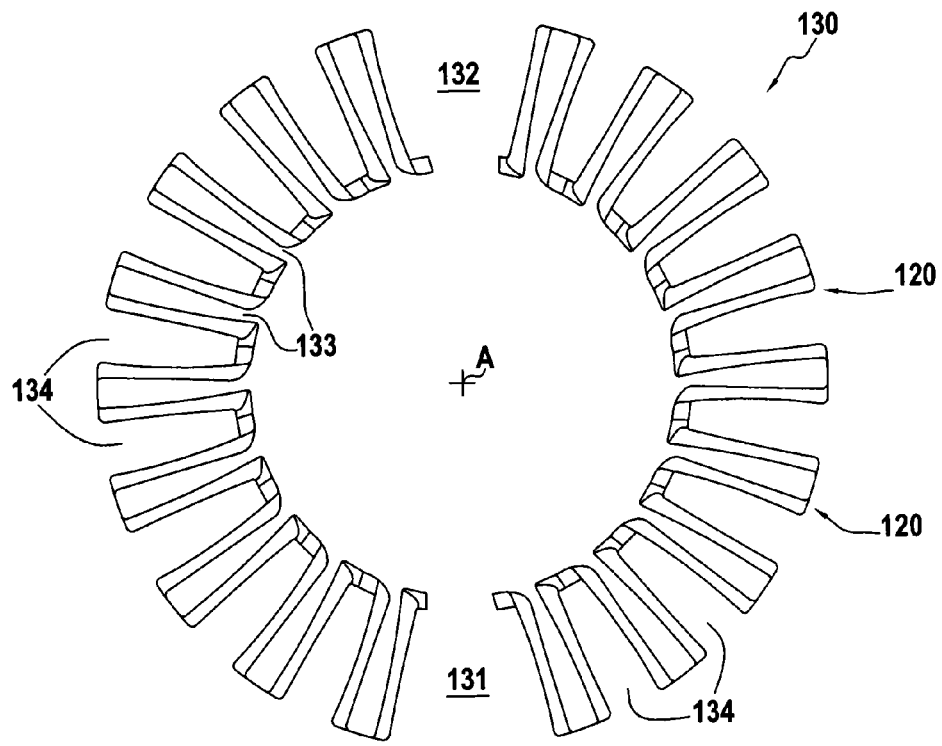
Figure 4C:
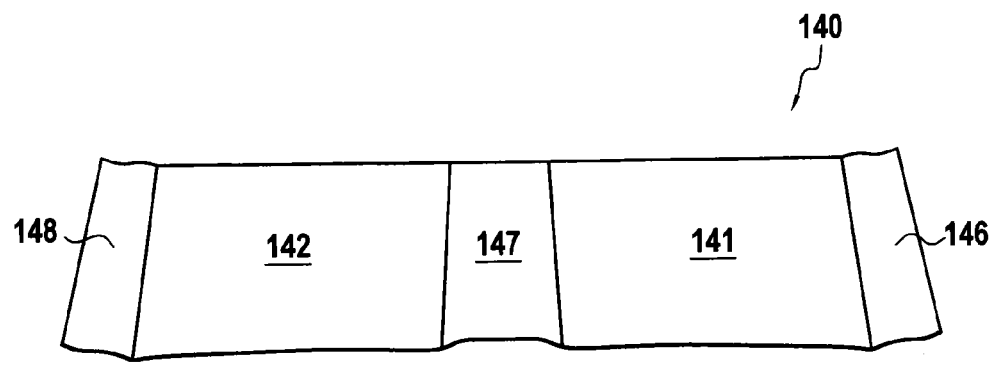
Figure 4D:
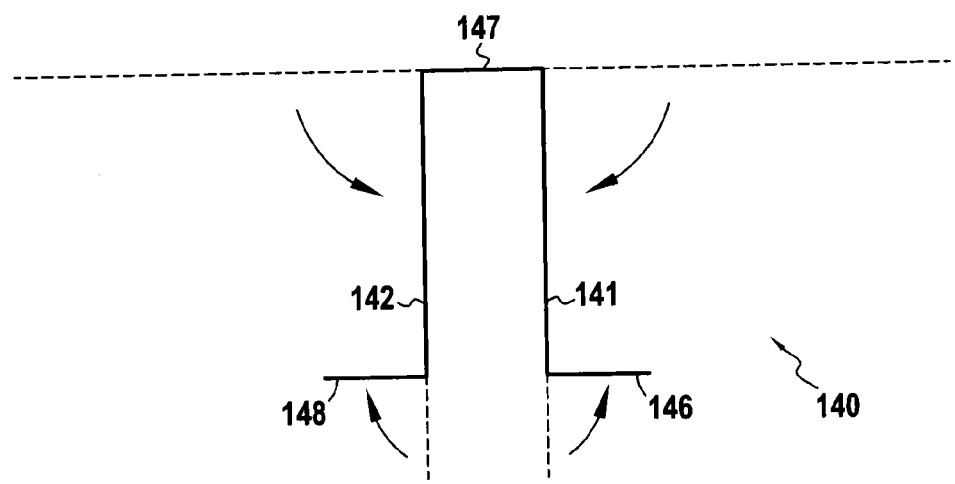
Figure 4E:
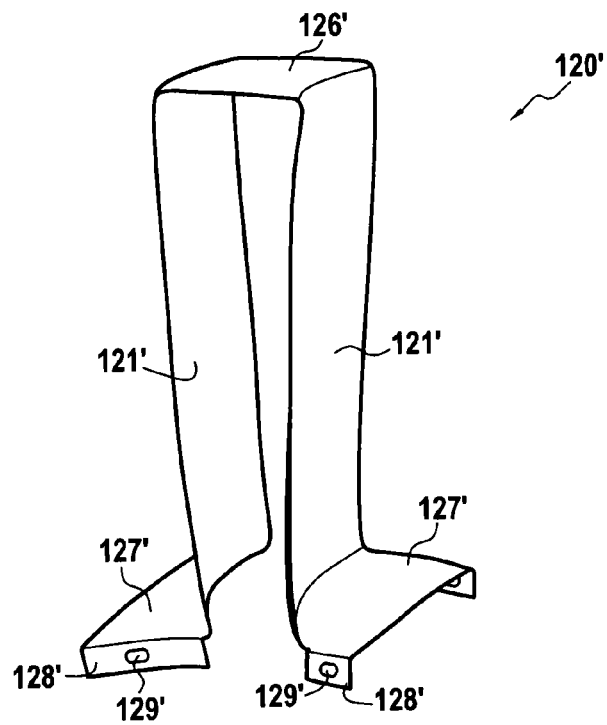

FIG. 4E shows a variant fastening in which the bottom transverse vane portions 127' of the module 120' have lateral extra lengths 128' forming fastener tabs provided with axial holes 129'. The fastener elements are then provided under the bottom transverse vane portions 127': they therefore no longer project into the secondary passage II, and the bottom transverse plane portions 127' can therefore act as platforms.

Figure 4F:
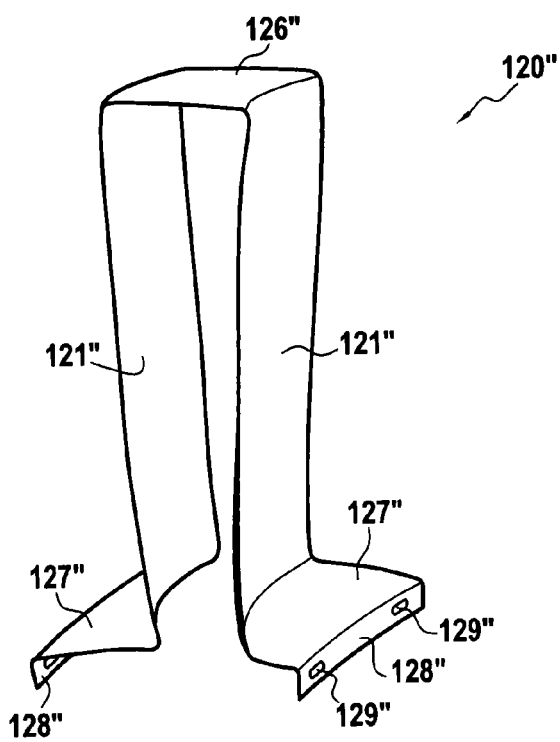

The same applies in the second fastener variant of FIG. 4F in which the bottom transverse vane portions 127" of the module 120" have end extra lengths 128" forming fastener tabs provided with tangential holes 129".

Although not shown, it should be observed that the top transverse vane portion 126 also has various fastener options, and in particular fasteners of radial or axial type as described above.

It should also be observed that it is equally possible to envisage a head-to-toe inverted variant similar to the module 20' of FIG. 3B.

FIG. 4B shows the complete annulus 130 made up of modules 120 for mounting in the intermediate casing. This annulus 130 thus has a succession of contiguous modules arranged in such a manner that the spacing between the vanes 121 is substantially identical all around the annulus 130. The vacant sectors 131 and 132 situated respectively at 6 o'clock and at 12 o'clock relative to the main axis A correspond to the positions of the structural arms 13 of the intermediate casing 10. While the annulus 130 is being assembled in the intermediate casing 10, the inner and outer vacant segments 133 and 134 situated respectively between the bottom and top transverse vane portions 127 and 126 of the modules 120 may be filled in by aerodynamic panels (not shown) serving to complete the wall of the secondary passage II.

FIG. 4C shows the 3D woven preform 140 laid out flat, which preform is used for making this second module embodiment 120. FIG. 4D shows this preform 140 shaped in order to obtain the module 120. From upstream to downstream, i.e. from right to left in the figures, this preform 140 comprises a first transverse segment 146 that is to form a bottom transverse vane portion 127, a first longitudinal segment 141 that is to form a first vane 121, a second transverse segment 147 that is to form the top transverse vane portion 126, a second longitudinal segment 142 that is to form the second vane 121, and a third transverse segment 148 that is to form the second bottom transverse vane portion 127 of the module 120.

The weaving and the shaping of the preform 140 and the method of forming the module are analogous to those of the first embodiment and they are therefore not described again in detail. In this embodiment, and as represented by the arrows in FIG. 4D, shaping consists essentially in folding the longitudinal segments 141 and 142 relative to the second transverse segment 147, and in folding down the first and third transverse segments 146 and 148 so they point away from each other.

Figure 5A:
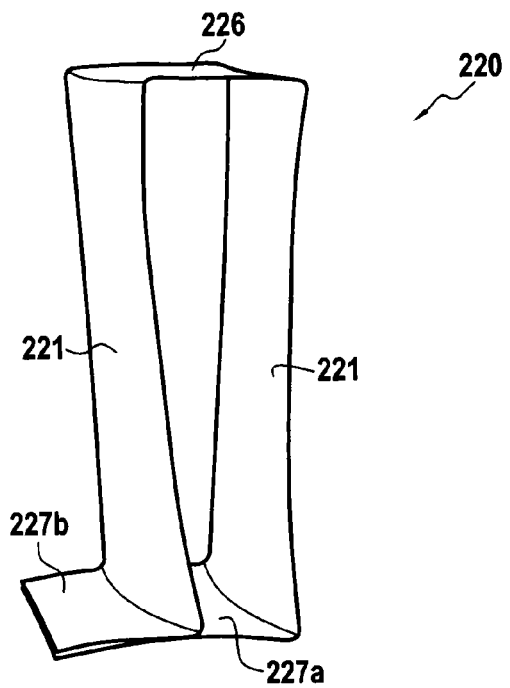
FIGS. 5A to 5E show a third element of a module of the invention.

FIGS. 5A to 5E shows a third module embodiment for the intermediate casing 10. In FIG. 5A, it can be seen that this third module embodiment 220 is generally in the form of a box. It comprises two longitudinal vanes 221, a top transverse vane portion 226 interconnecting the two vanes 221 at their top ends, and two bottom transverse vane portions 227*a* and 227*b*, the first vane portion 227*a* extending between the bottom ends of the vanes 221, and the second vane portion extending transversely from the bottom end of one of the vanes 121 outwards from the module 220.

The various ways in which this module 220 can be fastened are analogous to those described above and they are therefore neither described nor shown again.

It should also be observed that a head-to-toe inverted variant could equally well be envisaged on the same lines as the module 20' of FIG. 3B.

Figure 5B:
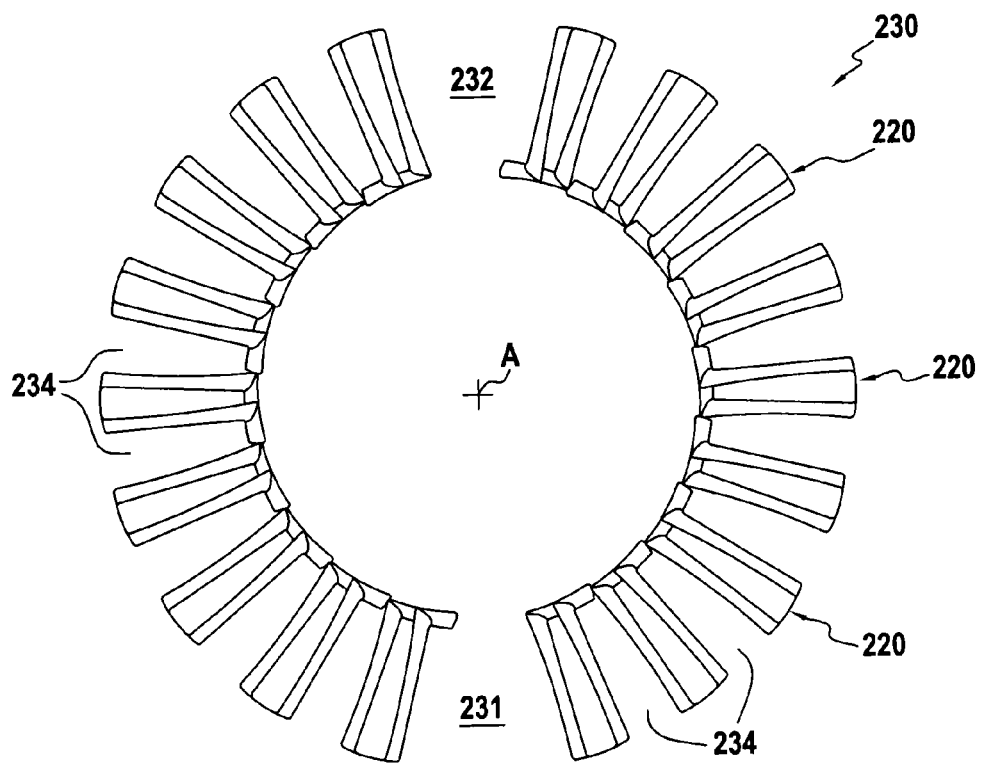

FIG. 5B shows the complete annulus 230 made up of modules 220 for mounting in the intermediate casing 10. The annulus 230 thus comprises a succession of contiguous modules 220 arranged so that the spacing between the vanes 221 is substantially identical all around the annulus 230. The vacant sectors 231 and 232 situated respectively at 6 o'clock and at 12 o'clock relative to the main axis A correspond to the positions of the structural arms 13 of the intermediate casing 10. While the annulus 130 is being assembled in the intermediate casing 10, the outer vacant segments 234 situated between the top transverse vane portions 226 of the modules 220 may be filled in by aerodynamic panels (not shown) serving to complete the wall of the secondary passage II. It should be observed at this point that the shape of this module 220 does not leave any inner segment vacant.

Figure 5C:
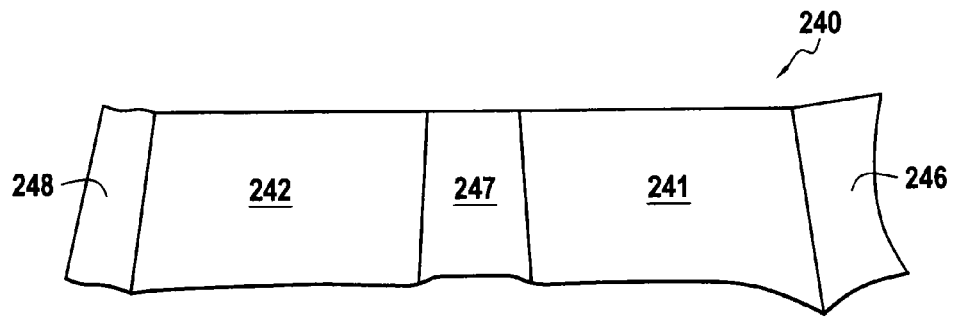
Figure 5D:
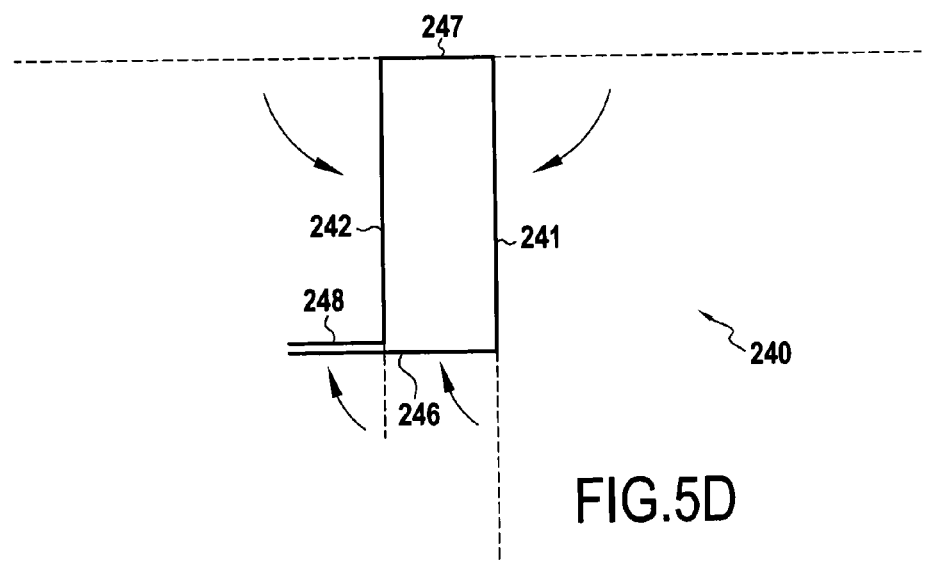

FIG. 5C shows the 3D woven preform 240 laid out flat, which preform is used for making this third module embodiment 220. FIG. 5D shows how this preform 240 is shaped in order to obtain the module 220. From upstream to downstream, i.e. from right to left in the figures, this preform 240 comprises a first transverse segment 246 that forms the first bottom transverse vane portion 227*a* and the bottom layer of the second bottom transverse vane portion 227*b*, a first longitudinal segment 241 that forms a first vane 221, a second transverse segment 247 that forms the top transverse vane portion 226, a second longitudinal segment 242 that forms the second vane 221, and a third transverse segment 248 that forms the top layer of the second bottom transverse vane portion 227*b* of the module 220.

The weaving and the shaping of this preform 240 and the method of forming the module are analogous to those of the first embodiment and they are therefore not described again in detail. In this embodiment, as represented by the arrows in FIG. 5D, shaping consists essentially in folding the longitudinal segments 241 and 242 relative to the second transverse segment 247, and in folding the third transverse segment 248 outwards and then in folding the first transverse segment 246 against the third transverse segment 248. In this overlap zone, the first and third transverse segments 246 and 248 may be secured to each other, in particular by adhesive.

Figure 5E:
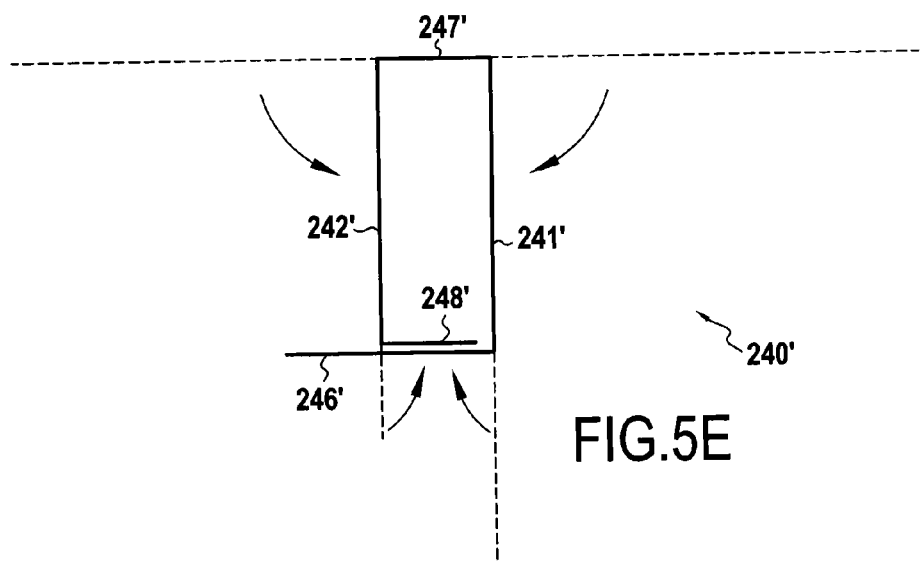

In a variant shown in FIG. 5E, the preform 240' has the same segments 246', 241', 247', 242', and 248' as in the above variant, but the shaping differs from the shaping thereof. In this variant, the third transverse segment 248' is folded inwards, thereby forming the top layer of the first bottom transverse vane portion 227a', and the first transverse segment 246' is folded against the third transverse segment 248', thereby forming the bottom layer of the third bottom transverse vane portion 227'a and of the second bottom transverse vane portion 227b'.

Figure 6A:
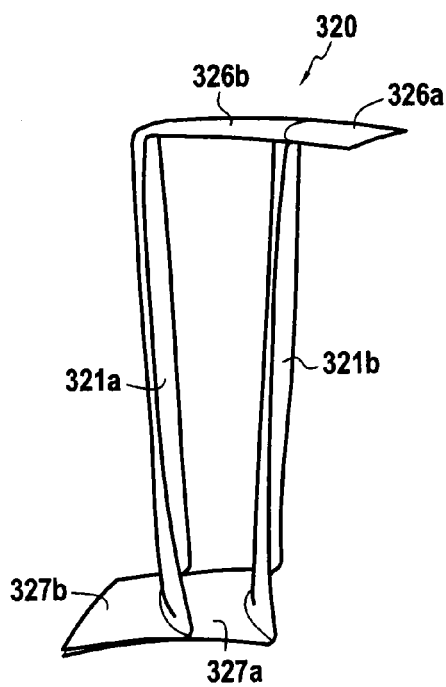
FIGS. 6A to 6H shows a fourth example of a module of the invention.

FIGS. 6A to 6H show a fourth module embodiment for the intermediate casing 10. In FIG. 6A, it can be seen that this fourth module embodiment 320 has first and second longitudinal vanes 321a and 321b, a first top transverse vane portion 326a extending transversely from the top end of the second vane 321b to the outside of the module 320, a second top transverse vane portion 326b connecting together the top ends of the two vanes 321a and 321b, a first bottom transverse vane portion 327a extending between the bottom ends of the vanes 321a and 321b, and a second bottom transverse vane portion 327b extending transversely from the bottom end of the first vane 321a towards the outside of the module 320.

The various ways in which this module 320 can be fastened are analogous to those described above and they are therefore not described or shown again.

It should also be observed that a head-to-toe inverted variant based on the module 20' of FIG. 3B could also be envisaged.

Figure 6B:
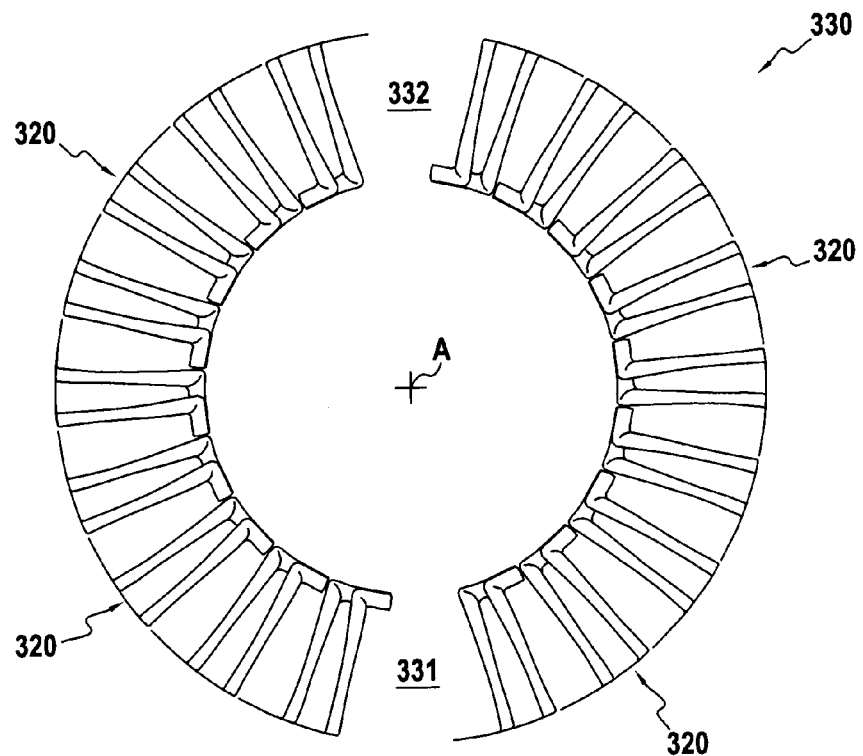

FIG. 6B shows the complete annulus 330 made up of modules 320 for mounting in the intermediate casing 10. This annulus 330 thus comprises a succession of contiguous modules 320 arranged so that the spacing between the vanes 321a and 321b is substantially identical all around the annulus 230. The vacant sectors 331 and 332 situated respectively at 6 o'clock and at 12 o'clock relative to the main axis A correspond to the positions of the structural arms 13 of the intermediate casing 10. It should be observed at this point that the shape of this module 320 does not leave any inner or outer segment vacant.

Figure 6C:
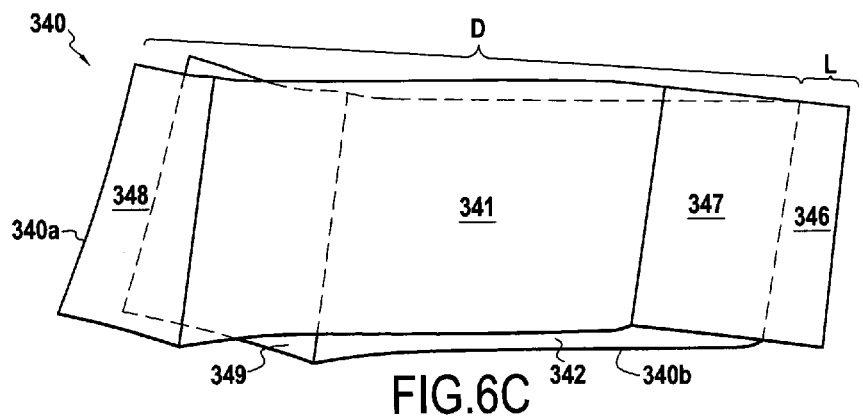
Figure 6D:
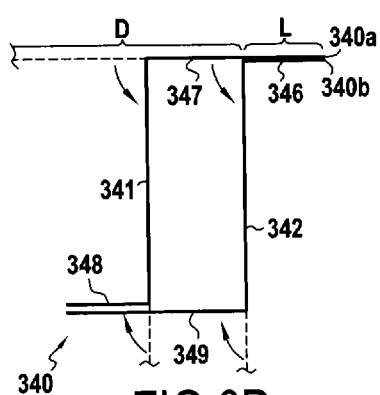

FIG. 6C shows the 3D woven preform 340 laid out flat, which preform is used for making this fourth module embodiment 320. FIG. 6D shows how this preform 340 is shaped in order to obtain the module 320. This preform 340 comprises a first sheet 340a and a second sheet 340b that are woven together and that possess a short interlinked zone L and a long non-interlinked zone D.

Figure 6E:
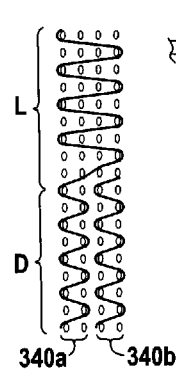

Weaving methods that enable such non-interlinking to be obtained are nowadays well known in the field of 3D weaving. By way of illustration, FIG. 6E is a diagram showing the end of such interlinked weaving. In the interlinked zone L, the sheets 340a and 340b are woven together with common weft yarns passing through the entire thickness of the assembly constituted by the first sheet 340a and the second sheet 340b so as to connect together all of the layers of warp yarns. In the non-interlinked zone D, the sheets 340a and 340b are woven at the same time using weft yarns that are independent for each of the sheets 340a and 340b, such that a non-interlinked plane is left between the first sheet 340a and the second sheet 340b.

From upstream to downstream, i.e. from right to left in the Figures, this preform 340 comprises the interlinked zone L with a first transverse segment 346 that forms the first top transverse vane portion 326a, followed by the non-interlinked zone for which the first sheet 340a forms a second transverse segment 347 that forms the second top transverse vane portion 326b, a first longitudinal segment 341 that forms the first vane 321a, and a third transverse segment 348 that forms the top layer of the second bottom transverse vane portion 327b, while the second sheet 340b comprises a second longitudinal segment 342 that forms the second vane 221b, and a fourth transverse segment 349 that forms the first bottom transverse plane portion 327a and the bottom layer of the second bottom transverse vane portion 327b.

Other than making use of a non-interlinked zone, as explained above, the weaving and the shaping of this preform 340 and the method of forming the module are analogous to those of the first embodiment and are therefore not described again in detail. In this embodiment, as represented by the arrows in FIG. 6D, shaping consists essentially in folding the longitudinal segments 341 and 342 of each sheet 340a and 340b relative to the first and second transverse segments 346 and 347, in folding the third transverse segment 348 outwards, and then in folding the fourth transverse segment 349 against the third transverse segment 348.

Figure 6F:
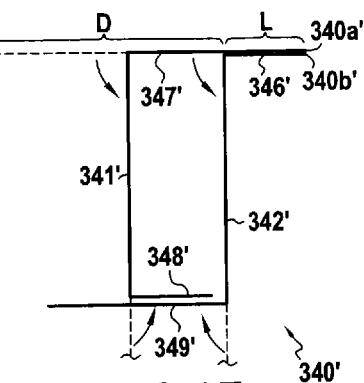

A variant analogous to that of FIG. 5E is also possible in this embodiment: this variant is shown in FIG. 6F, with the third transverse segment 348' being folded inwards and the fourth transverse segment 349' being folded against the third transverse segment 348'.

Figure 6G:
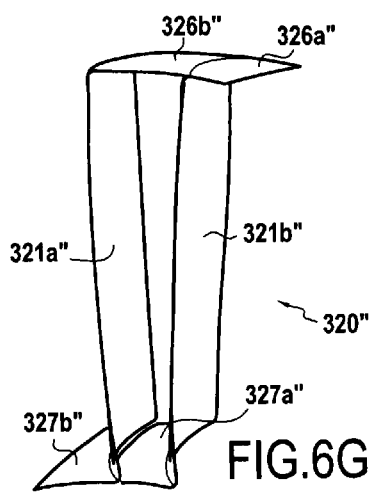
Figure 6H:
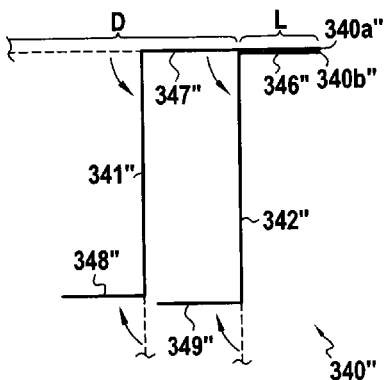

In yet another variant shown in FIGS. 6G and 6H, the bottom transverse vane portions 327a" and 327b" of the module 320" do not overlap but extend in close-fitting manner one beside the other. Thus, during shaping of the preform 340", the fourth transverse segment 349' is folded towards the third transverse segment 348" which then lies adjacent thereto without overlapping.

The embodiments described above in the present description are given by way of non-limiting illustration, and in the light of this description a person skilled in the art can easily modify these embodiments or can envisage others, while remaining within the scope of the invention.

Furthermore, the various characteristics of these embodiments may be used on their own or in combination. When they are combined, these characteristics may be combined as described above, or otherwise, the invention not being limited to the specific combinations described in the present specification. In particular, unless specified to the contrary, any characteristic described with reference to any one embodiment may be applied in analogous manner to any other embodiment.

The invention claimed is:

1. A fiber preform for a vane module of an intermediate casing of a turbine engine, said preform comprising:
   a first longitudinal segment, presenting opposite first and second ends, for forming a first vane;
   a second longitudinal segment, presenting first and second opposite ends, for forming a second vane; and
   a first transverse segment, presenting a first end connected to the first end of the first longitudinal segment and a second end connected to the first end of the second longitudinal segment, for forming a first transverse vane portion, wherein the preform is obtained by three-dimensional weaving, wherein the preform is laid out flat in an unshaped state of the preform, and in a shaped state of the preform, the first ends of the first and second longitudinal segments are folded such that the first and second longitudinal segments face each other, and wherein a thickness of the first transverse segment is the same in the unshaped state and in the shaped state.

2. The preform according to claim 1, further comprising:

a second transverse segment, extending transversely from the second end of the first longitudinal segment, for forming a second transverse vane portion; and a third transverse segment, extending transversely from the second end of the second longitudinal segment, for forming a third transverse vane portion.

3. The preform according to claim 2, wherein the second transverse segment extends away from the second longitudinal segment, and wherein the third transverse segment extends away from the first longitudinal segment.

4. The preform according to claim 2, wherein the second transverse segment extends towards the second longitudinal segment, and wherein the third transverse segment extends away from the first longitudinal segment.

5. The preform according to claim 2, wherein the second transverse segment extends towards the second longitudinal segment, and wherein the third transverse segment extends towards the first longitudinal segment.

6. The preform according to claim 4, wherein the second and third transverse segments overlap, at least in part.

7. A module for making an intermediate casing of a turbine engine, said module having two longitudinal vanes and a transverse vane portion interconnecting the two vanes at one of their ends, said module being a single-piece part, wherein the module is made of composite material from a fiber preform according to claim 1, said preform being shaped in a mold and embedded in a matrix.

8. An intermediate casing for a turbine engine, the casing comprising a plurality of modules according to claim 7 arranged angularly between an inner hub and an outer shroud.

9. A turbine engine, comprising an intermediate casing according to claim 8.

10. A fiber preform for a vane module of an intermediate casing of a turbine engine, the preform being obtained by three-dimensional weaving and comprising:

a first longitudinal segment, presenting opposite first and second ends, for forming a first vane;

a second longitudinal segment, presenting first and second opposite ends, for forming a second vane; and a first transverse segment, presenting a first end connected to the first end of the first longitudinal segment and a second end connected to the first end of the second longitudinal segment, for forming a first transverse vane portion, the preform comprising first and second sheets that are woven together and that comprise an interlinked zone forming an additional transverse segment for forming a transverse vane portion, and a non-interlinked zone in which the first sheet forms the first transverse segment and the first longitudinal segment, wherein the second sheet forms the second longitudinal segment, wherein the preform is laid out flat in an unshaped state of the preform, and in a shaped state of the preform, the first ends of the first and second longitudinal segments are folded such that the first and second longitudinal segments face each other, and wherein a thickness of the first transverse segment is the same in the unshaped state and in the shaped state.

11. A module for making an intermediate casing of a turbine engine, said module having two longitudinal vanes and a transverse vane portion, such as a flange or a platform, interconnecting the two vanes at one of their ends, said module being a single-piece part, wherein the module is made of composite material from a fiber preform according to claim 10, said preform being shaped in a mold and embedded in a matrix.

12. An intermediate casing for a turbine engine, the casing comprising a plurality of modules according to claim 11 arranged angularly between an inner hub and an outer shroud.

13. A turbine engine, comprising an intermediate casing according to claim 12.

* * * * *